(12) United States Patent
Ku

(10) Patent No.: US 8,368,564 B2
(45) Date of Patent: Feb. 5, 2013

(54) WIRELESS KEYBOARD HAVING WATERPROOF MECHANISM

(76) Inventor: Allen Ku, Walnut, CA (US)

( * ) Notice: Subject to any disclaimer, the term of this patent is extended or adjusted under 35 U.S.C. 154(b) by 234 days.

(21) Appl. No.: 12/861,837

(22) Filed: Aug. 24, 2010

(65) Prior Publication Data

US 2012/0050076 A1  Mar. 1, 2012

(51) Int. Cl.
*H03K 17/94* (2006.01)
(52) U.S. Cl. ........................................................ 341/22
(58) Field of Classification Search .................. 341/20, 341/22; 361/749–751; 400/472–474, 490, 400/496, 691–693.1
See application file for complete search history.

(56) References Cited

U.S. PATENT DOCUMENTS

| | | | | |
|---|---|---|---|---|
| 5,180,237 A | * | 1/1993 | Chen | 400/479 |
| 5,613,223 A | * | 3/1997 | Ross et al. | 455/575.1 |
| 5,872,527 A | * | 2/1999 | Yanagisawa | 341/22 |
| 6,054,939 A | * | 4/2000 | Wei et al. | 341/20 |
| 6,156,983 A | * | 12/2000 | Chen et al. | 200/302.1 |
| 6,178,619 B1 | * | 1/2001 | Tai | 29/622 |
| 6,542,355 B1 | * | 4/2003 | Huang | 361/679.08 |
| 7,428,140 B2 | * | 9/2008 | Yokote | 361/679.09 |
| 7,750,261 B2 | * | 7/2010 | Tsai et al. | 200/302.2 |

* cited by examiner

*Primary Examiner* — Khanh V Nguyen
(74) *Attorney, Agent, or Firm* — Li & Cai Intellectual Property (USA) Office

(57) ABSTRACT

A wireless keyboard having a water proof mechanism includes a signal processing module and a flexible keyboard connected to one side of the signal processing module. The signal processing module includes an upper casing, a lower casing located under the upper casing, a waterproof gasket located between peripheries of the upper casing and the lower casing, and a processing unit received between the upper casing and the lower casing to emit wireless signals to a computer host. The flexible keyboard includes an upper film, a lower film hermetically connected to the upper film, and a plurality of key units electrically connected to the processing unit, wherein one common side of the upper film and the lower film is sandwiched between the upper casing and the lower casing.

15 Claims, 6 Drawing Sheets

US 8,368,564 B2

WIRELESS KEYBOARD HAVING WATERPROOF MECHANISM

BACKGROUND OF THE INVENTION

1. Field of the Invention

The present invention relates to a wireless keyboard having a waterproof mechanism; in particular, to a wireless keyboard having a waterproof mechanism capable of preventing against the penetration of liquid into the keyboard.

2. Description of Related Art

The existing keyboard is not provided with a sufficient waterproof mechanism, so that liquid can still penetrate the keyboard through gaps between the keys provided on an upper casing of the keyboard, especially through the opening of a link bar. In view of the above, the waterproof mechanism of the conventional keyboard is also provided with drainage holes for retarding the liquid from entering the keyboard. When the liquid splashes into the keyboard by accident, a user has to tilt the keyboard to drain the liquid out of the keyboard as soon as possible.

Therefore, the above design still has some inconvenience. Furthermore, the conventional keyboard cannot be used in a severe environment such as a factory having a large amount of moisture or powder.

In view of the above, the present Inventor proposes a reasonable and novel structure based on his researches and expert knowledge.

SUMMARY OF THE INVENTION

The object of the present invention is to provide a wireless keyboard having a waterproof mechanism, which is capable of preventing against the penetration of liquid into the keyboard, and all surfaces of the keyboard including the top surface, side surfaces and connecting portions thereof are excellently waterproof. Therefore, the present invention can be used in a severe environment.

Furthermore, the keyboard of the present invention can be operated in a wireless manner, so that it is very convenient for use. Even, a signal processing portion of the keyboard has a waterproof effect. Moreover, the wireless keyboard having a waterproof mechanism according to the present invention can be rolled up for easy carry.

In order to achieve the aforementioned objects, according to an embodiment of the present invention, a wireless keyboard having a waterproof mechanism includes a signal processing module and a flexible keyboard connected to one side of the signal processing module. The signal processing module includes an upper casing, a lower casing located under the upper casing, a waterproof gasket located between peripheries of the upper casing and the lower casing, and a processing unit received between the upper casing and the lower casing to emit wireless signals to a computer host. The flexible keyboard includes an upper film, a lower film hermetically connected to the upper film, and a plurality of key units electrically connected to the processing unit, wherein one common side of the upper film and the lower film is sandwiched between the upper casing and the lower casing.

The present invention has following advantageous features. The connecting portion between the upper casing and the lower casing of the present invention is provided with a waterproof gasket for preventing the penetration of liquid into the keyboard. The present invention provides a complete waterproof effect. Not only the signal processing module but also the flexible keyboard is excellently waterproof. Furthermore, the flexible keyboard 20 can be rolled up for easy carry.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
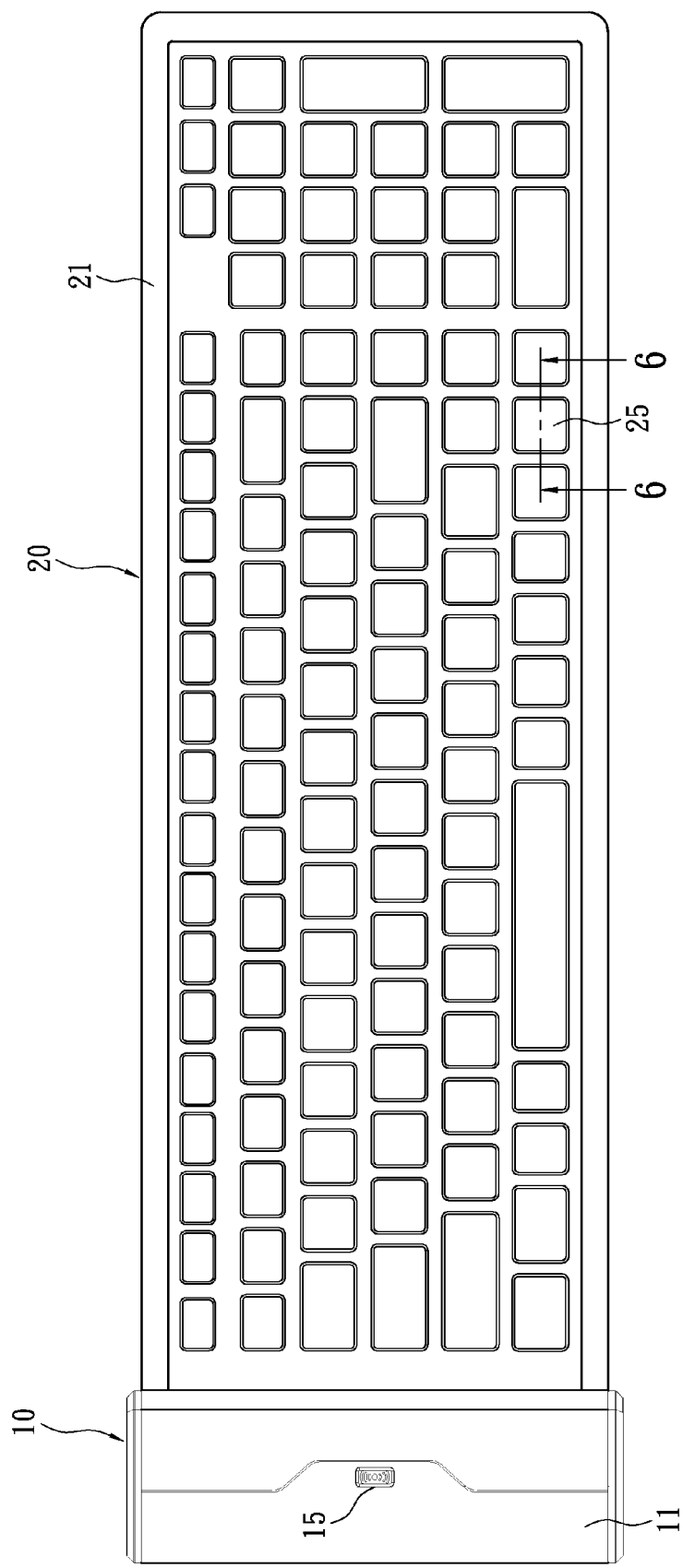
FIG. 1 shows a top view showing a wireless keyboard having a waterproof mechanism according to the present invention.

Please refer to FIG. 1, which is a top view of the present invention. The present invention provides a wireless keyboard having a waterproof mechanism, which includes a signal processing module 10 and a flexible keyboard 20. The signal processing module 10 is configured to wirelessly transmit signals generated by the flexible keyboard 20 to a computer host (not shown). The flexible keyboard 20 is connected to one side of the signal processing module 10, and the flexible keyboard 20 can be rolled up for easy carry.

Figure 2:
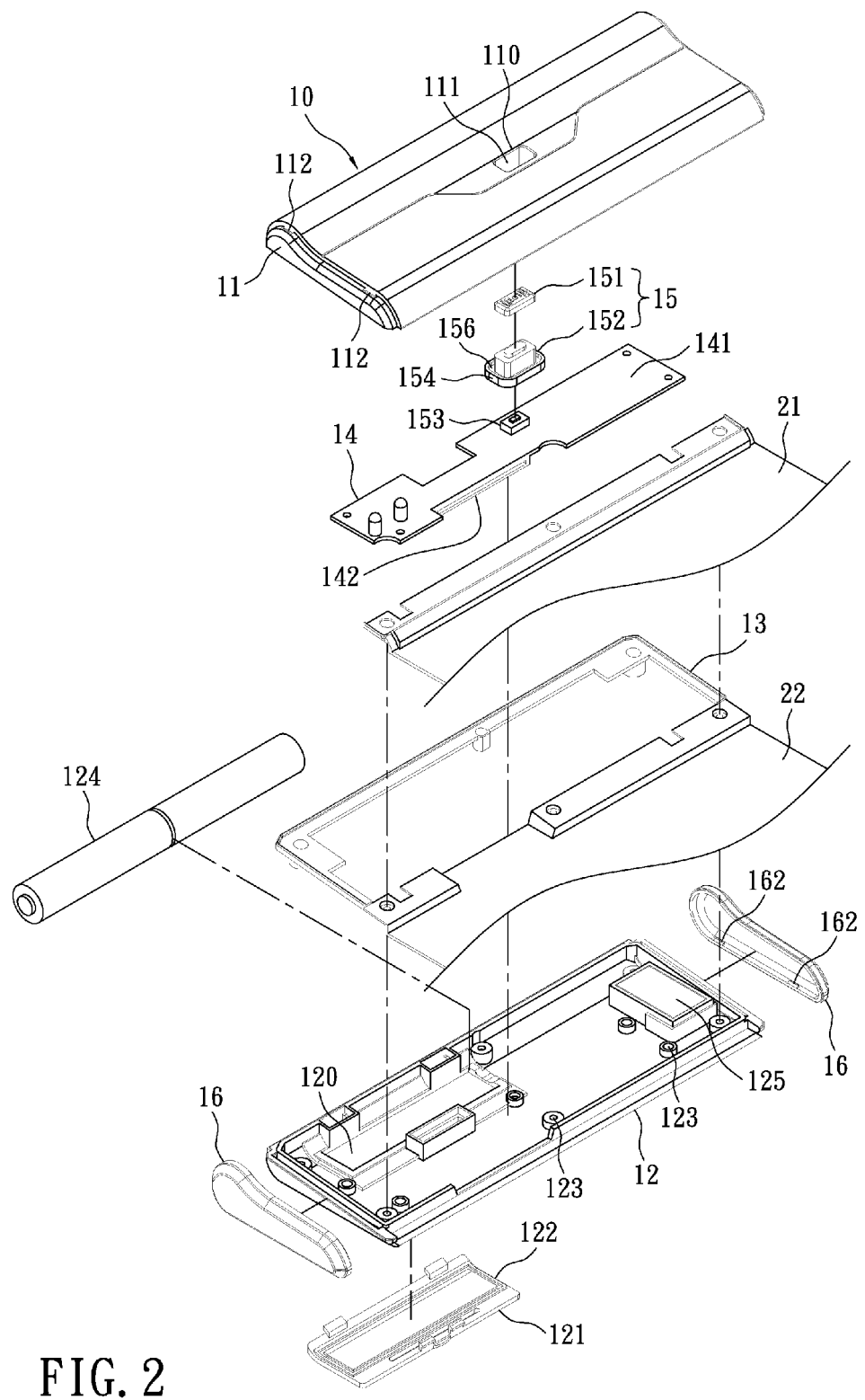
FIG. 2 shows an exploded perspective view showing the wireless keyboard having a waterproof mechanism according to the present invention.
Figure 3:
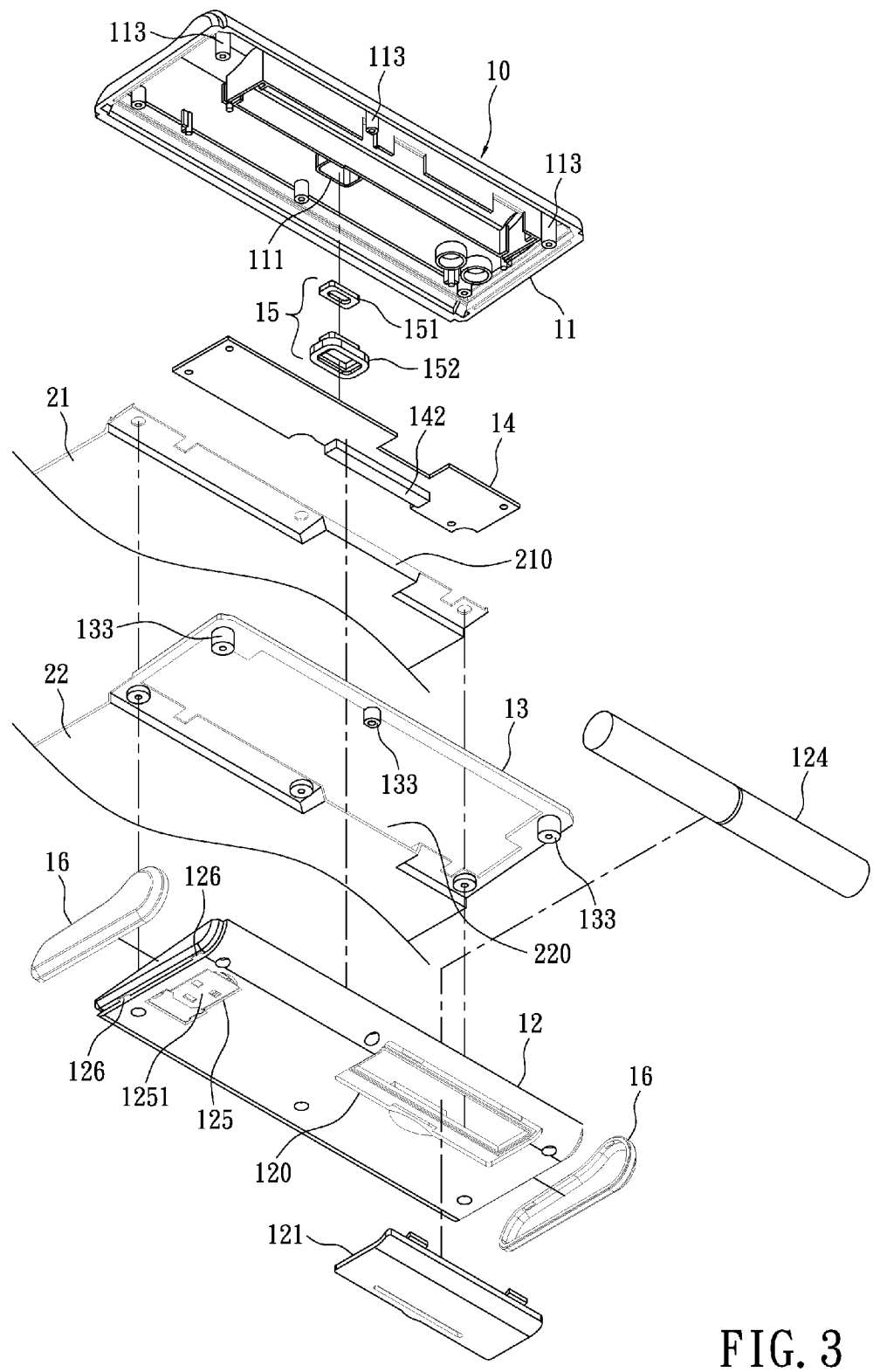
FIG. 3 shows another exploded perspective view showing the wireless keyboard having a waterproof mechanism according to the present invention.

Please refer to FIGS. 2 and 3, both of which are partial exploded perspective views showing the wireless keyboard having a waterproof mechanism according to the present invention. The signal processing module 10 includes an upper casing 11, a lower casing 12 located below the upper casing 11, a waterproof gasket 13 located between the peripheries of the upper casing 11 and the lower casing 12, and a processing unit 14 received between the upper casing 11 and the lower casing 12. The waterproof gasket 13 is configured to prevent liquid from penetrating into the upper casing 11 and the lower casing 12. The processing unit 14 includes a circuit board 141 and other electronic elements (not shown) and is configured to receive the signals generated by the flexible keyboard 20 and to emit signals in a wireless manner.

The flexible keyboard 20 includes an upper film 21, a lower film 22 hermetically connected to the upper film, and a plurality of key units 25 electrically connected to the processing unit 14. One common side of the upper film 21 and the lower film 22 is sandwiched between the upper casing 11 and the lower casing 12. In the drawings, the upper film 21 and the lower film 22 are separated from each other for better illustration. Actually, excluding the common sandwiched side, three of the four sides of the upper film 21 and the lower film 22 are hermetically connected to each other. Thus, the flexible keyboard 20 has a good waterproof effect. Further, in the present embodiment, the lower film 22 is integrally connected to the waterproof gasket 13, thereby generating a better effect of preventing against the penetration of moistures.

According to the present invention, the signal processing module 10 further includes a signal checking key 15 for cooperating with a wireless receiver 1251 shown in FIG. 3 to check the frequencies of signals. The signal checking key 15 is wirelessly connected to the wireless receiver 1251 and includes a keycap 151 exposed to the upper casing 11, an elastic cover 152 located below the keycap 151, and a micro-switch 153 located below the elastic cover 152. When the user presses the keycap 151, the elastic cover 152 is pressed downwards to activate the micro-switch 153. Since the elastic cover 152 is made of plastic materials having elasticity, the elastic cover 152 can return to its original shape. In the present embodiment, the elastic cover 152 is square, but it may be circular or other suitable shape.

In order to provide the elastic cover 152 with a waterproof capability, the elastic cover 152 has a waterproof frame 154 protruding outwards and upwards from its bottom, and a liquid trough 156 formed inside the waterproof frame 154. The upper casing 11 has a keyhole 110 for allowing the keycap 151 to be exposed to the outside, and an extension wall 111 surrounding the keyhole 110. The top edge of the waterproof frame 152 is adhered to the bottom edge of the extension wall 111. When the liquid splashes the signal checking key 15 by accident, the liquid will be restricted in the liquid trough 156 without flowing into the signal processing module 10.

The lower casing 12 of the signal processing module 10 includes a battery trough 120 for accommodating batteries 124, a battery cover 121 for covering the battery trough 120, and a second waterproof gasket 122 provided on the battery cover 121. With this arrangement, the liquid cannot penetrate into the signal processing module 10 through the battery trough 120.

In the present embodiment, it should be noted that the lower casing 12 of the signal processing module 10 includes a receiver-accommodating chamber 125 for accommodating a receiver. The receiver-accommodating chamber 125 is integrally formed with the inner bottom surface of the lower casing 10 for accommodating the wireless receiver 1251. Thus, the wireless receiver 1251 can be received in the wireless keyboard of the present invention easily, so that the user can take the wireless keyboard together with the wireless receiver 1251.

In the present embodiment, the wireless keyboard having a waterproof mechanism further includes a pair of side covers 16 provided on both sides of the upper casing 11 and the lower casing 12. Each of the side covers 16 is formed with a plurality of hooks 162. Each of the upper casing 11 and the lower casing 12 is formed with a plurality of locking grooves 112, 126 for allowing the hooks 162 to be inserted therein.

In the present embodiment, the upper casing 11 and the lower casing 12 are connected to each other by screws. Each of the upper casing 11 and the lower casing 12 is formed with a plurality of hollow inner-threaded posts 113, 123. The waterproof gasket 13 is formed with a plurality of hollow posts 133 to correspond to the hollow inner-threaded posts 113, 123. The hollow posts 133 (not shown) are slightly smaller than the screws in terms of diameter, thereby elastically covering the respective screws to generate a waterproof effect.

Figure 4:
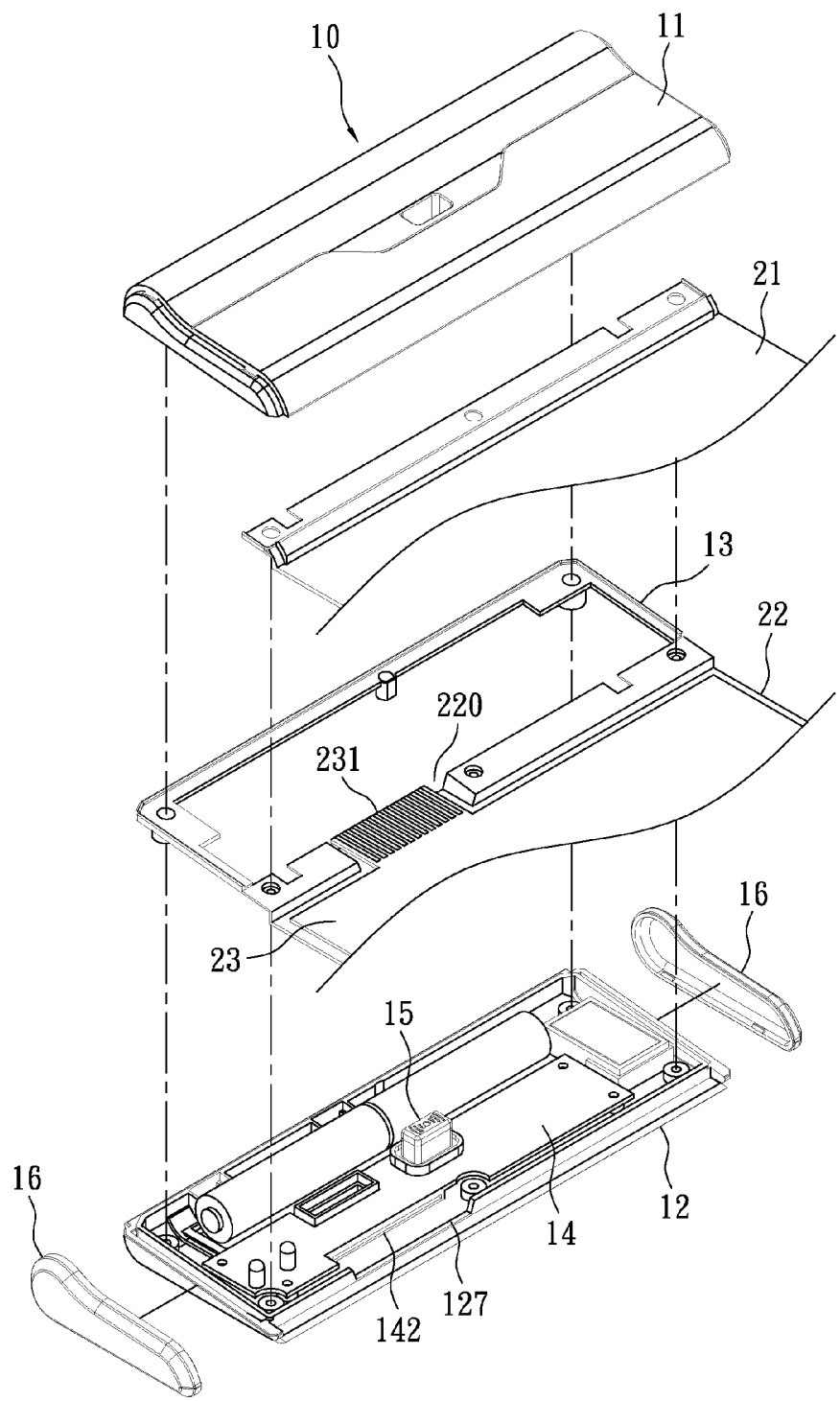
FIG. 4 shows a partially exploded perspective view showing the wireless keyboard having a waterproof mechanism according to the present invention.

Please refer to FIG. 4, which is another partial exploded perspective view showing the wireless keyboard having a waterproof mechanism according to the present invention. The flexible keyboard 20 further includes an electrical conductive film 23 located between the upper film 21 and the lower film 22. The electrical conductive film 23 has a connecting end 231 extending to the signal processing module 10 to be electrically connected to the processing unit 14. In the present embodiment, the lower film 22 and the lower casing 12 are formed with a first trough 220 and a second trough 127 respectively. The connecting end 231 of the electrical conductive film 23 passes through the first trough 220 and the second trough 127. With reference to FIG. 3 again. The processing unit 14 has an electrical connector 142 located on its bottom surface for allowing the connecting end 231 of the electrical conductive film 23 to be inserted therein (the electrical conductive film 23 is omitted in this figure). Further, a pressing block 210 protrudes from the bottom surface of the upper film 21 to be engaged with the first trough 220. The pressing block 210 abuts against and secures the connecting end 231, so that the connecting end 231 can be tightly pressed between the upper film 21 and the lower film 22.

Figure 5:
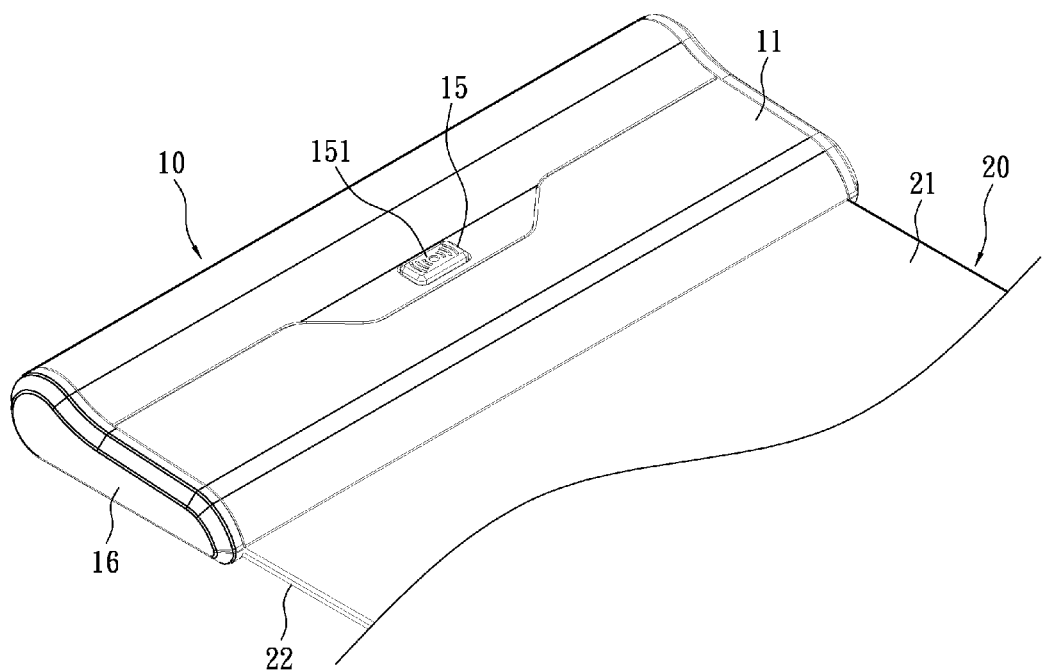
FIG. 5 shows a partially assembled perspective view showing the wireless keyboard having a waterproof mechanism according to the present invention.

Please refer to FIG. 5, which is a partially assembled perspective view showing the wireless keyboard having a waterproof mechanism according to the present invention. With the above-mentioned structure, the wireless keyboard of the present invention not only has a waterproof effect, but also has an aesthetic exterior and a streamline profile. As view from the top, the signal checking key 15 of the signal processing module 10 has a waterproof effect. As view from the side, the waterproof gasket 13 can prevent the liquid from penetrating into the upper casing 11 and the lower casing 12. Moreover, the side cover 16 also prevents the penetration of liquid to a certain extent. Since the upper film 21 and the lower film 22 of the flexible keyboard 20 are inherently elastic and made of plastic materials, the combination of the upper casing 11 and the lower casing 12 between which the upper film 21 and the lower film 22 are tightly sandwiched also prevents against the penetration of liquid.

Figure 6:
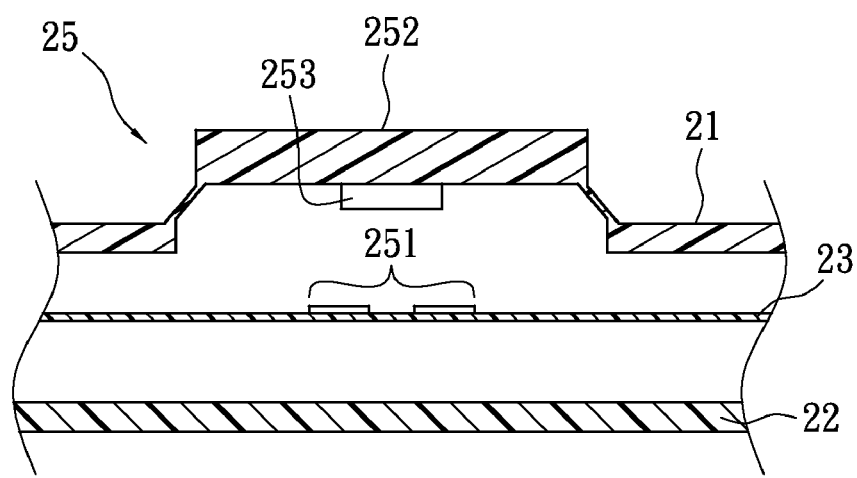
FIG. 6 is a cross-sectional view taken along the line 6-6 in FIG. 1.

Please refer to FIG. 6, which is a cross-sectional view taken along the line 6-6 in FIG. 1 and shows a cross section of the key unit 25 of the present invention. Each of the key units 25 includes an electrical conductive circuit 251 formed on the electrical conductive film 23, a cap portion 252 protruding upwards from the upper film 21 and located above the electrical conductive circuit 251, and a conductor 253 located on the bottom surface of the cap portion 252. When the cap portion 252 is pressed, an electric current passes through the conductor 253 to generate a signal. The electrical conductive film 23 transmits the signal to the processing unit 14. The processing unit 14 processes the received signal, converts it into a wireless signal and transmits the converted wireless signal to the wireless receiver 1251 on the computer host.

With the above-mentioned arrangement, the wireless keyboard having a waterproof mechanism according to the present invention provides a complete waterproof effect and has the following advantageous features:

(I) The signal processing module 10 has a complete waterproof effect. As view from the top, the signal checking key 15 has a waterproof effect. As view from the side, the waterproof gasket 13 can prevent liquid from penetrating into the upper casing 11 and the lower casing 12. Moreover, the side cover 16 also prevents the penetration of liquid to a certain extent. As view from the bottom, with the second waterproof gasket 122, the battery cover 121 can prevent the penetration of liquid through the battery trough 120.

(II) The flexible keyboard 20 has a complete waterproof effect. The connecting portions of the upper film 21, the lower film 22 and the signal processing module 10 are sandwiched by the upper casing 11 and the lower casing 12. The rest three sides of the upper film 21 and the lower film 22 are hermetically connected. Thus, by this structure, a better effect of preventing the penetration of liquid can be generated.

(III) The flexible keyboard 20 can be rolled up, so that it is convenient for the user to carry.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A wireless keyboard having a waterproof mechanism, comprising:
   a signal processing module, including:
      an upper casing;
      a lower casing located below the upper casing;
      a waterproof gasket located between peripheries of the upper casing and the lower casing; and
      a processing unit received between the upper casing and the lower casing to emit wireless signals to a computer host; and
   a flexible keyboard, connected to one side of the signal processing module and including:
      an upper film;
      a lower film hermetically connected to the upper film; and
      a plurality of key units electrically connected to the processing unit, one common side of the upper film and the lower film being sandwiched between the upper casing and the lower casing.

2. The wireless keyboard having a waterproof mechanism according to claim 1, wherein the signal processing module further includes a signal checking key, the signal checking key comprises a keycap exposed to the upper casing, an elastic cover located below the keycap, and a micro-switch provided below the elastic cover.

3. The wireless keyboard having a waterproof mechanism according to claim 2, wherein the elastic cover has a waterproof frame protruding outwards and upwards from its bottom, the upper casing has a keyhole for allowing the keycap to be exposed to the outside and an extension wall extending downwards from an edge of the keyhole, the top edge of the waterproof frame is adhered to the bottom edge of the extension wall.

4. The wireless keyboard having a waterproof mechanism according to claim 3, wherein the elastic cover has a liquid trough formed inside the waterproof frame.

5. The wireless keyboard having a waterproof mechanism according to claim 1, wherein the lower casing of the signal processing module includes a battery trough, a battery cover for covering the battery trough, and a second waterproof gasket provided on the battery cover.

6. The wireless keyboard having a waterproof mechanism according to claim 1, wherein the lower casing of the signal processing module includes a receiver-accommodating chamber, the receiver-accommodating chamber is formed on the bottom surface of the lower casing for accommodating a wireless receiver.

7. The wireless keyboard having a waterproof mechanism according to claim 1, further including a pair of side covers provided on both sides of the upper casing and the lower casing.

8. The wireless keyboard having a waterproof mechanism according to claim 7, wherein each of the pair of side covers is formed with a plurality of hooks, the upper casing and the lower casing are respectively formed with a plurality of locking grooves for allowing the hooks to be inserted therein.

9. The wireless keyboard having a waterproof mechanism according to claim 1, wherein the upper casing and the lower casing are formed with a plurality of hollow inner-threaded posts respectively, and the waterproof gasket is formed with a plurality of hollow posts to correspond to the hollow inner-threaded posts.

10. The wireless keyboard having a waterproof mechanism according to claim 1, wherein the lower film of the flexible keyboard is formed with a first trough and the lower casing is formed with a second trough.

11. The wireless keyboard having a waterproof mechanism according to claim 10, wherein the flexible keyboard includes an electrical conductive film located between the upper film and the lower film, the electrical conductive film has a connecting end passing through the first trough and the second trough, the connecting end extends to the signal processing module and is electrically connected to the processing unit.

12. The wireless keyboard having a waterproof mechanism according to claim 11, wherein each of the upper film and the lower film has four sides, three of the four sides of the upper film and the lower film are hermetically connected to each other.

13. The wireless keyboard having a waterproof mechanism according to claim 11, wherein a pressing block protrudes from a bottom surface of the upper film to be engaged with the first trough, the pressing block of the upper film abuts against the connecting end.

14. The wireless keyboard having a waterproof mechanism according to claim 11, wherein the processing unit includes a circuit board and an electrical connector provided on a bottom surface of the circuit board, the connecting end of the electrical conductive film is inserted into the electrical connector.

15. The wireless keyboard having a waterproof mechanism according to claim 11, wherein each of the key units includes an electrical conductive circuit formed on the electrical conductive film, a cap portion protruding upwards from the upper film and located above the electrical conductive film, and a conductor provided on the bottom surface of the cap portion.

* * * * *